United States Patent
Aizawa

(10) Patent No.: US 7,631,177 B2
(45) Date of Patent: *Dec. 8, 2009

(54) INFORMATION INPUT SYSTEM, CONTROL METHOD THEREOF, AND STORAGE MEDIUM

(75) Inventor: Takashi Aizawa, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/277,600

(22) Filed: Nov. 25, 2008

(65) Prior Publication Data

US 2009/0083456 A1 Mar. 26, 2009

Related U.S. Application Data

(63) Continuation of application No. 10/928,480, filed on Aug. 26, 2004, now Pat. No. 7,472,265, which is a continuation of application No. 09/426,662, filed on Oct. 25, 1999, now Pat. No. 6,832,275.

(30) Foreign Application Priority Data

Oct. 29, 1998 (JP) ................................. 10-308954

(51) Int. Cl.
G06F 13/14 (2006.01)
(52) U.S. Cl. .............. 713/1; 713/2; 710/62; 348/207.1; 348/207.11; 348/207.2; 348/207.99
(58) Field of Classification Search ...................... 713/1, 713/2; 710/62; 348/207.1, 207.11, 207.2, 348/207.99
See application file for complete search history.

(56) References Cited

U.S. PATENT DOCUMENTS

| | | | |
|---|---|---|---|
| 5,438,359 A | 8/1995 | Aoki | |
| 5,534,921 A | 7/1996 | Sawanobori | |
| 5,648,816 A | 7/1997 | Wakui | |
| 5,661,823 A | 8/1997 | Yamauchi et al. | |
| 5,797,750 A * | 8/1998 | Gouriou et al. | ............. 434/100 |
| 5,956,084 A | 9/1999 | Moronaga et al. | |
| 6,020,982 A | 2/2000 | Yamauchi et al. | |
| 6,088,532 A | 7/2000 | Yamamoto et al. | |

(Continued)

FOREIGN PATENT DOCUMENTS

JP 03-117181 5/1991

(Continued)

*Primary Examiner*—Abdelmoniem Elamin
(74) *Attorney, Agent, or Firm*—Canon U.S.A., Inc. I.P. Division

(57) ABSTRACT

This invention has as its object to provide an information input system which can flexibly select the storage location of information input from an input apparatus. To achieve this object, in an information input system which comprises an input apparatus for inputting information, and an information processing apparatus which is connected to the input apparatus and processes information transferred from the input apparatus, the input apparatus has a storage unit for storing input information, a connection detection device for detecting whether or not the information processing apparatus is connected to the input apparatus, and a controller for controlling to transfer the input information to the information processing apparatus without storing the information in the storage unit, when the connection detection device detects that the information processing apparatus is connected to the input apparatus.

6 Claims, 7 Drawing Sheets

U.S. PATENT DOCUMENTS

| | | |
|---|---|---|
| 6,111,604 A | 8/2000 | Hashimoto et al. |
| 6,151,652 A | 11/2000 | Kondo et al. |
| 6,239,837 B1 | 5/2001 | Yamada et al. |
| 6,295,139 B1 | 9/2001 | Yamauchi et al. |
| 6,297,870 B1 | 10/2001 | Nanba |
| 6,344,875 B1 | 2/2002 | Hashimoto et al. |
| 6,549,958 B1 | 4/2003 | Kuba |
| 6,570,614 B1 | 5/2003 | Kubo et al. |
| 6,630,958 B2 | 10/2003 | Tanaka et al. |
| 6,832,275 B1 * | 12/2004 | Aizawa ....................... 710/62 |
| 7,472,265 B2 * | 12/2008 | Aizawa ......................... 713/1 |
| 2004/0179115 A1 * | 9/2004 | Tomat et al. ............. 348/231.6 |

FOREIGN PATENT DOCUMENTS

| | | |
|---|---|---|
| JP | 6-125488 | 5/1994 |
| JP | 08-191410 A | 7/1996 |
| JP | 10-257365 | 9/1998 |
| JP | 10-257370 | 9/1998 |
| JP | 10-257371 | 9/1998 |

* cited by examiner

SAVING LOCATION SELECTION MENU

SAVING LOCATION SELECTION MEMBER

INFORMATION INPUT SYSTEM, CONTROL METHOD THEREOF, AND STORAGE MEDIUM

RELATED APPLICATION INFORMATION

This application is a continuation of U.S. application Ser. No. 10/928,480 filed Aug. 26, 2004, now U.S. Pat. No. 7,472,265 which is a continuation of 09/426,662 filed Oct. 25, 1999, now U.S. Pat. No. 6,832,275, which are incorporated herein by reference.

BACKGROUND OF THE INVENTION

The present invention relates to an information input system such as a digital camera system for sensing, e.g., moving and still images, its control method, and a storage medium.

However, in the prior art, even in a system in which a digital camera is connected to a PC to sense an image, e.g., a system in which image data used in business are continuously sensed and sensed data are directly processed and managed by the PC, the sensed image data are temporarily recorded on the internal recording device of the digital camera or the recording medium detachable from the digital camera, and are then transferred to the PC via the cable, thus processing and saving the image data. For this reason, image data and the like gradually accumulate in the internal recording device of the digital camera or the detachable recording medium, and if the internal recording device or recording medium becomes full of data, it cannot record data any more. When this occurs, it is only after these image data are deleted or the recording medium is replaced by another one, that image sensing can be proceeded.

When a system that transfers sensed image data or the like to a PC, and processes and manages the data is built using a digital camera which does not have any internal recording device but has only a recording medium detachable from the digital camera, since the sensed image data are processed and managed by the PC, they need not be saved in the detachable recording medium. However, even in such case, image sensing cannot be done unless the detachable recording medium is attached to the digital camera.

SUMMARY OF THE INVENTION

The present invention has been made in consideration of the above-mentioned problems, and has as its object to provide an information input system, which can flexibly select the storage location of information input from an input apparatus, its control method, and a storage medium.

In order to solve the above problems and to achieve the above object, an information input system according to the present invention is characterized by the following arrangement according to its first aspect.

That is, there is provided an information input system which comprises an input apparatus for inputting information, and an information processing apparatus which is connected to the input apparatus and processes information transferred from the input apparatus, the input apparatus comprising: storage means for storing input information; connection detection means for detecting whether or not the information processing apparatus is connected to the input apparatus; and control means for controlling to transfer the input information to the information processing apparatus without storing the information in the storage means, when the connection detection means detects that the information processing apparatus is connected to the input apparatus.

An information input system according to the present invention is characterized by the following arrangement according to its second aspect.

That is, there is provided an information input system which comprises an input apparatus for inputting information, and an information processing apparatus which is connected to the input apparatus and processes information transferred from the input apparatus, the input apparatus comprising: storage means for storing input information; connection detection means for detecting whether or not the information processing apparatus is connected to the input apparatus; effective area detection means for detecting an information storable area of the storage means; and control means for controlling to transfer the input information to the information processing apparatus, when the connection detection means detects that the information processing apparatus is connected to the input apparatus, and the effective area detection means detects that the storage means has no storable area.

An information input system according to the present invention is characterized by the following arrangement according to its third aspect.

That is, there is provided an information input system which comprises an input apparatus for inputting information, and an information processing apparatus which is connected to the input apparatus and processes information transferred from the input apparatus, one of the input apparatus and the information processing apparatus comprising designation means for designating a storage method of information input by the input apparatus, and the input apparatus comprising storage means for storing input information, connection detection means for detecting whether or not the information processing apparatus is connected to the input apparatus, and control means for controlling a storage location of the input information on the basis of a detection signal from the connection detection means, and the storage method designated by the designation means.

A method of controlling an information input system according to the present invention is characterized by the following arrangement according to its first aspect.

That is, there is provided a method of controlling an information input system which comprises an input apparatus for inputting information, and an information processing apparatus which is connected to the input apparatus and processes information transferred from the input apparatus, and in which the input apparatus comprises storage means for storing input information, and connection detection means for detecting whether or not the information processing apparatus is connected to the input apparatus, comprising the step of: transferring the input information to the information processing apparatus without storing the information in the storage means, when the connection detection means detects that the information processing apparatus is connected to the input apparatus.

A method of controlling an information input system according to the present invention is characterized by the following arrangement according to its second aspect.

That is, there is provided a method of controlling an information input system which comprises an input apparatus for inputting information, and an information processing apparatus which is connected to the input apparatus and processes information transferred from the input apparatus, and in which the input apparatus comprises storage means for storing input information, connection detection means for detecting whether or not the information processing apparatus is connected to the input apparatus, and effective area detection means for detecting an information storable area of the storage means, comprising the step of: transferring the input information to the information processing apparatus, when the connection detection means detects that the information processing apparatus is connected to the input apparatus, and the effective area detection means detects that the storage means has no storable area.

A method of controlling an information input system according to the present invention is characterized by the following arrangement according to its third aspect.

That is, there is provided a method of controlling an information input system which comprises an input apparatus for inputting information, and an information processing apparatus which is connected to the input apparatus and processes information transferred from the input apparatus, and in which one of the input apparatus and the information processing apparatus comprises designation means for designating a storage method of information input by the input apparatus, and the input apparatus comprising storage means for storing input information, and connection detection means for detecting whether or not the information processing apparatus is connected to the input apparatus, comprising the step of: controlling a storage location of the input information on the basis of a detection signal from the connection detection means, and the storage method designated by the designation means.

A storage medium according to the present invention is characterized by the following arrangement according to its first aspect.

That is, there is provided a storage medium which stores a control program for controlling an information input system which comprises an input apparatus for inputting information, and an information processing apparatus which is connected to the input apparatus and processes information transferred from the input apparatus, and in which the input apparatus comprises storage means for storing input information, and connection detection means for detecting whether or not the information processing apparatus is connected to the input apparatus, the control program having: a code of the step of transferring the input information to the information processing apparatus without storing the information in the storage means, when the connection detection means detects that the information processing apparatus is connected to the input apparatus.

A storage medium according to the present invention is characterized by the following arrangement according to its second aspect.

That is, there is provided a storage medium which stores a control program for controlling an information input system which comprises an input apparatus for inputting information, and an information processing apparatus which is connected to the input apparatus and processes information transferred from the input apparatus, and in which the input apparatus comprises storage means for storing input information, connection detection means for detecting whether or not the information processing apparatus is connected to the input apparatus, and effective area detection means for detecting an information storable area of the storage means, the control program having: a code of the step of transferring the input information to the information processing apparatus, when the connection detection means detects that the information processing apparatus is connected to the input apparatus, and the effective area detection means detects that the storage means has no storable area.

A storage medium according to the present invention is characterized by the following arrangement according to its third aspect.

That is, there is provided a storage medium which stores a control program for controlling an information input system which comprises an input apparatus for inputting information, and an information processing apparatus which is connected to the input apparatus and processes information transferred from the input apparatus, and in which one of the input apparatus and the information processing apparatus comprises designation means for designating a storage method of information input by the input apparatus, and the input apparatus comprising storage means for storing input information, and connection detection means for detecting whether or not the information processing apparatus is connected to the input apparatus, the control program having: a code of the step of controlling a storage location of the input information on the basis of a detection signal from the connection detection means, and the storage method designated by the designation means.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiment of the present invention will be described in detail hereinafter with reference to the accompanying drawings.

Figure 1:
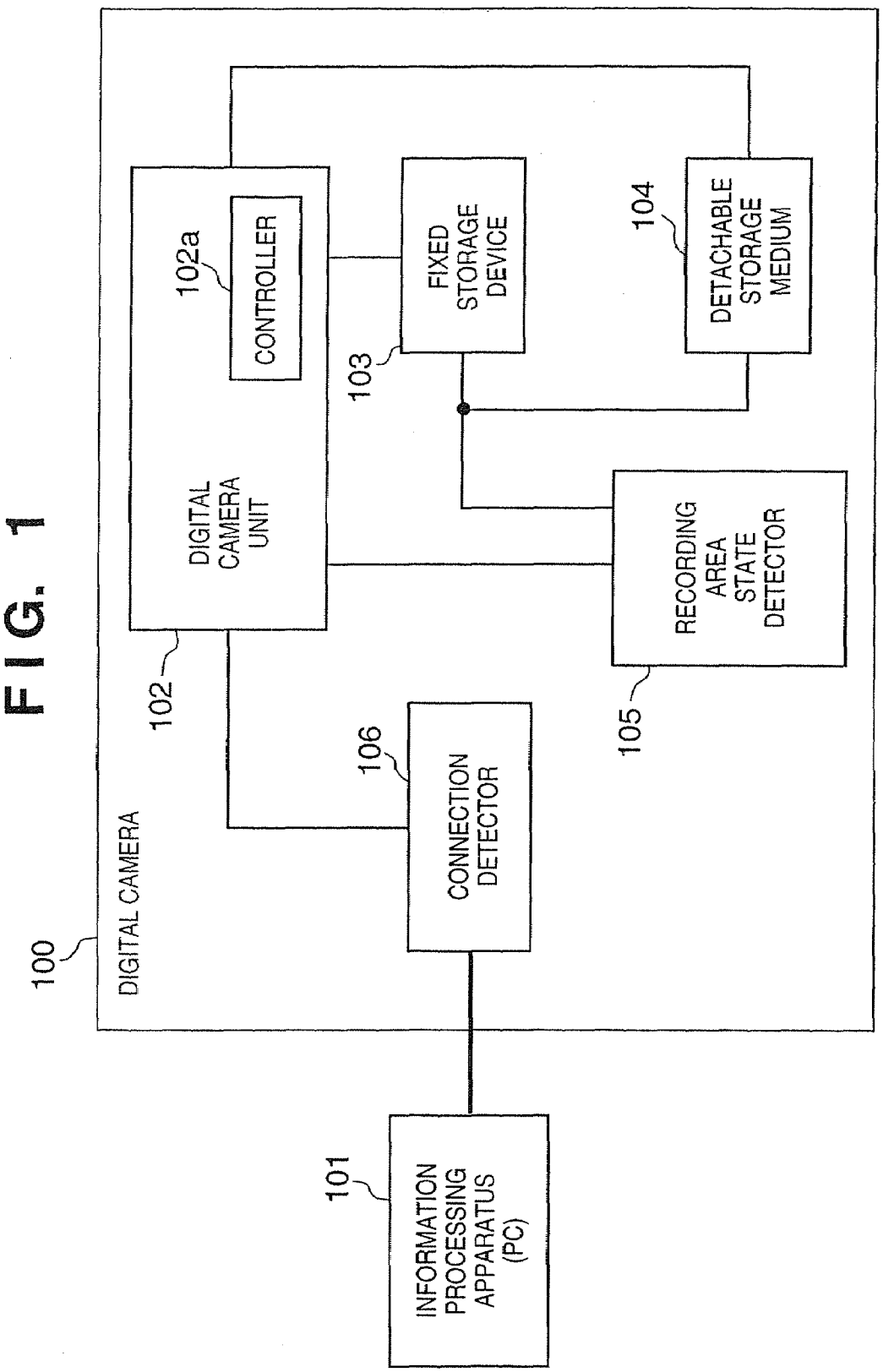
FIG. 1 is a block diagram showing the arrangement of a digital camera system as an embodiment of an information input system according to the present invention.

FIG. 1 is a block diagram showing the arrangement of a digital camera system as an embodiment of an information input system according to the present invention.

The digital camera system of this embodiment is roughly divided into a digital camera and an information processing apparatus. In FIG. 1, reference numeral 100 denotes a digital camera; and 101, an information processing apparatus for processing and managing image data and the like sensed by the digital camera. The information processing apparatus 101 normally uses a computer (PC) or the like, which includes an arithmetic processing device (CPU), primary storage device (RAM), secondary storage device (hard disk), operation device (keyboard, mouse), display device, and the like (not shown).

The digital camera 100 has a digital camera unit 102 which houses components such as a lens, CCD, signal processing circuit, and the like, which are required for sensing image data, and a controller 102a for controlling the overall digital camera 100. In the conventional arrangement, a digital camera has only a storage device 103 such as a fixed internal memory and a detachable storage medium 104 in addition to the digital camera unit 102, and records and saves information generated by the digital camera unit 102.

By contrast, in this embodiment, the digital camera 100 comprises a connection detector 106 for detecting connection to a PC and a recording state detector 105 in addition to the storage device 103 and storage medium 104.

The connection detector 106 detects not only a physical connection with the PC via a cable, but also completion of a so-called logical connection, e.g., a communicable state with driver software, client application software, or the like on the PC. Some detection methods are available in such case: for example, a method of making a logical connection by a specific software protocol, a connection method by recognizing a specific signal pattern, and the like.

The recording state detector 105 detects a free space in the storage device 103 such as the fixed internal memory or the like, or the detachable storage medium 104. Some models of digital cameras may have either one of the detachable storage medium 104 and the storage device 103 such as the fixed internal memory or the like.

The first example of the sensed image data saving sequence of the digital camera system of this embodiment will be explained below.

Figure 2:
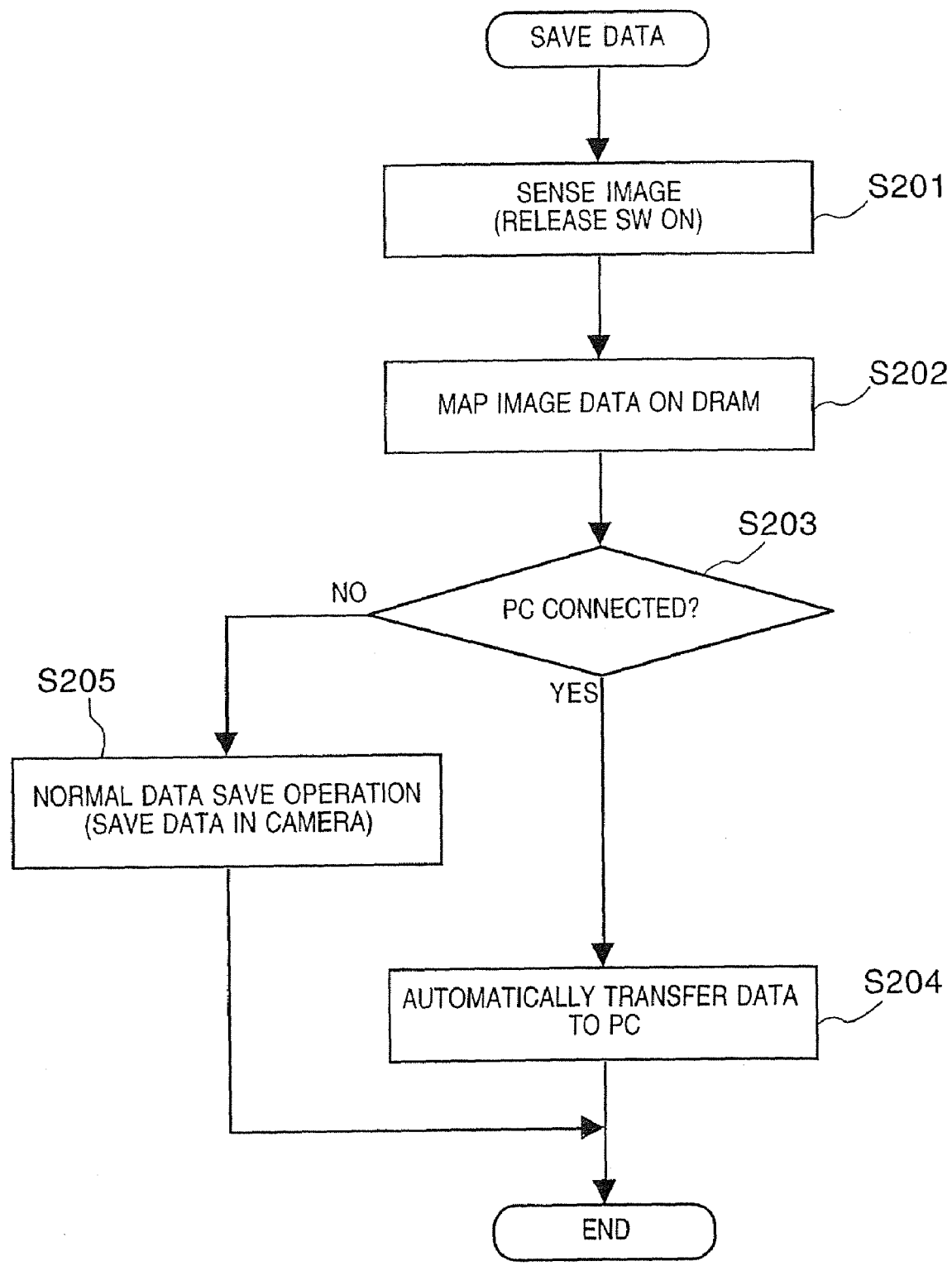
FIG. 2 is a flow chart showing the first example of a sensed image data saving sequence of the digital camera system of the embodiment.

FIG. 2 is a flow chart showing the first example of the sensed image data saving sequence of the digital camera system of this embodiment.

When the digital camera 100 is connected to the information processing apparatus 101, the connection detector 106 detects that fact, and sets an internal flag gConnectionFlag. If the user has pressed the release switch of the digital camera to sense an image (step S201), image data is temporarily stored in a work area (DRAM; not shown) in the digital camera unit 102 (step S202).

After that, the flag gConnectionFlag is checked (step S203). If the digital camera is not connected to the information processing apparatus 101, normal saving operation of the digital camera (e.g., for storing image data if the storage device 103 or storage medium 104 has a free space; otherwise, producing an alarm or the like) is made (step S205). If it is determined in step S203 that the digital camera is connected to the information processing apparatus 101, the data stored in the above-mentioned temporary work area (DRAM) is directly transferred to the information processing apparatus 101 via a cable (step S204).

The sequence of sensing and saving image data has been explained. If the digital camera has an audio recording function or a function of generating other kinds of information, such information is saved using the same means and sequence as those described above. In this case, image sensing in step S201 need only be replaced by generation of another information.

In this manner, when the user builds a system by connecting a digital camera to an information processing apparatus such as a PC or the like via a cable, he or she can immediately transfer information such as image data or the like sensed by the camera to the information processing apparatus such as the PC or the like, and does not record any image data in the digital camera. Hence, the user can execute a function such as image sensing without storing unnecessary data in the digital camera or even if the digital camera has no internal storage means.

Figure 3:
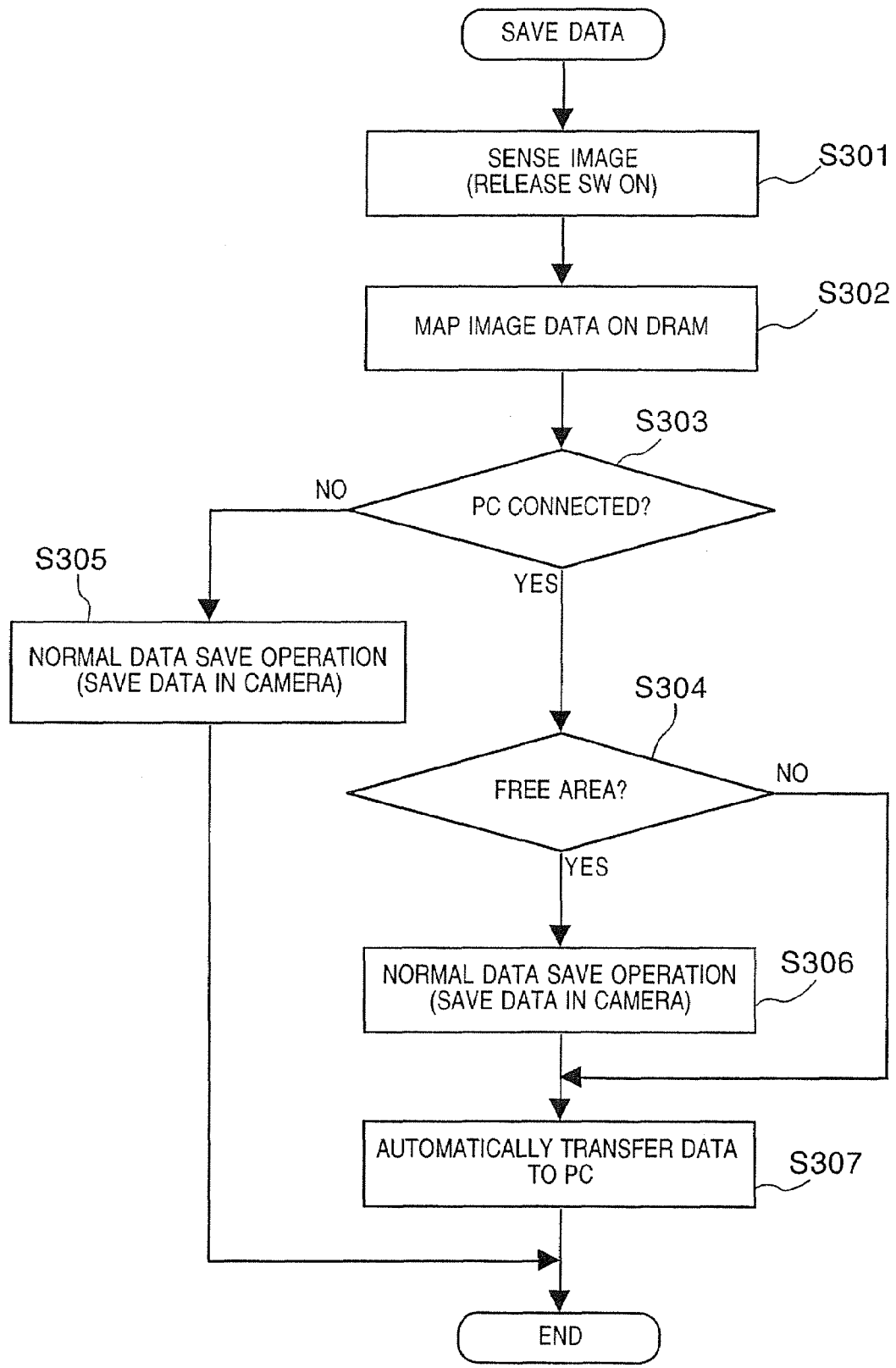
FIG. 3 is a flow chart showing the second example of a sensed image data saving sequence of the digital camera system of the embodiment.

FIG. 3 is a flow chart showing the second example of the sensed image data saving sequence of the digital camera system of this embodiment.

When the digital camera 100 is connected to the information processing apparatus 101, the connection detector 106 detects that fact, and sets an internal flag gConnectionFlag. If the user has pressed the release switch of the digital camera to sense an image (step S301), image data is temporarily stored in a work area (DRAM; not shown) in the digital camera unit 102 (step S302).

After that, the flag gConnectionFlag is checked (step S303). If the digital camera is not connected to the information processing apparatus 101, normal saving operation of the digital camera (e.g., for storing image data if the storage device 103 or storage medium 104 has a free space; otherwise, producing an alarm or the like) is made (step S305). If it is determined in step S303 that the digital camera is connected to the information processing apparatus 101, the result of the recording state detector 105 is checked to determine if an image data recordable area is available in the camera (step S304). If the recordable area is available, the data stored in the above-mentioned temporary work area (DRAM) is saved in the storage device 103 such as the fixed internal memory or the like or the detachable storage medium 104 in the camera (step S306). Then, the data is transferred to the information processing apparatus 101 via a cable (step S307). If it is determined in step S304 that an image data recordable area is not available in the camera, the data is immediately transferred to the information processing apparatus 101 via the cable (step S307).

The sequence of sensing and saving image data has been explained. If the digital camera has an audio recording function or a function of generating other kinds of information, such information is saved using the same means and sequence as those described above. In this case, image sensing in step S301 need only be replaced by generation of another information.

In this manner, when the user builds a system by connecting a digital camera to an information processing apparatus such as a PC or the like via a cable, he or she can transfer, process, and manage data such as a sensed image or the like to the information processing apparatus such as the PC or the like while saving the data in the internal recording device of the camera. Even when the camera does not have a sufficient area for saving data, the sensed data is transferred to the information processing apparatus. Hence, an alarm or the like is produced for the user, and the processing can be proceeded without losing data.

Figure 4:
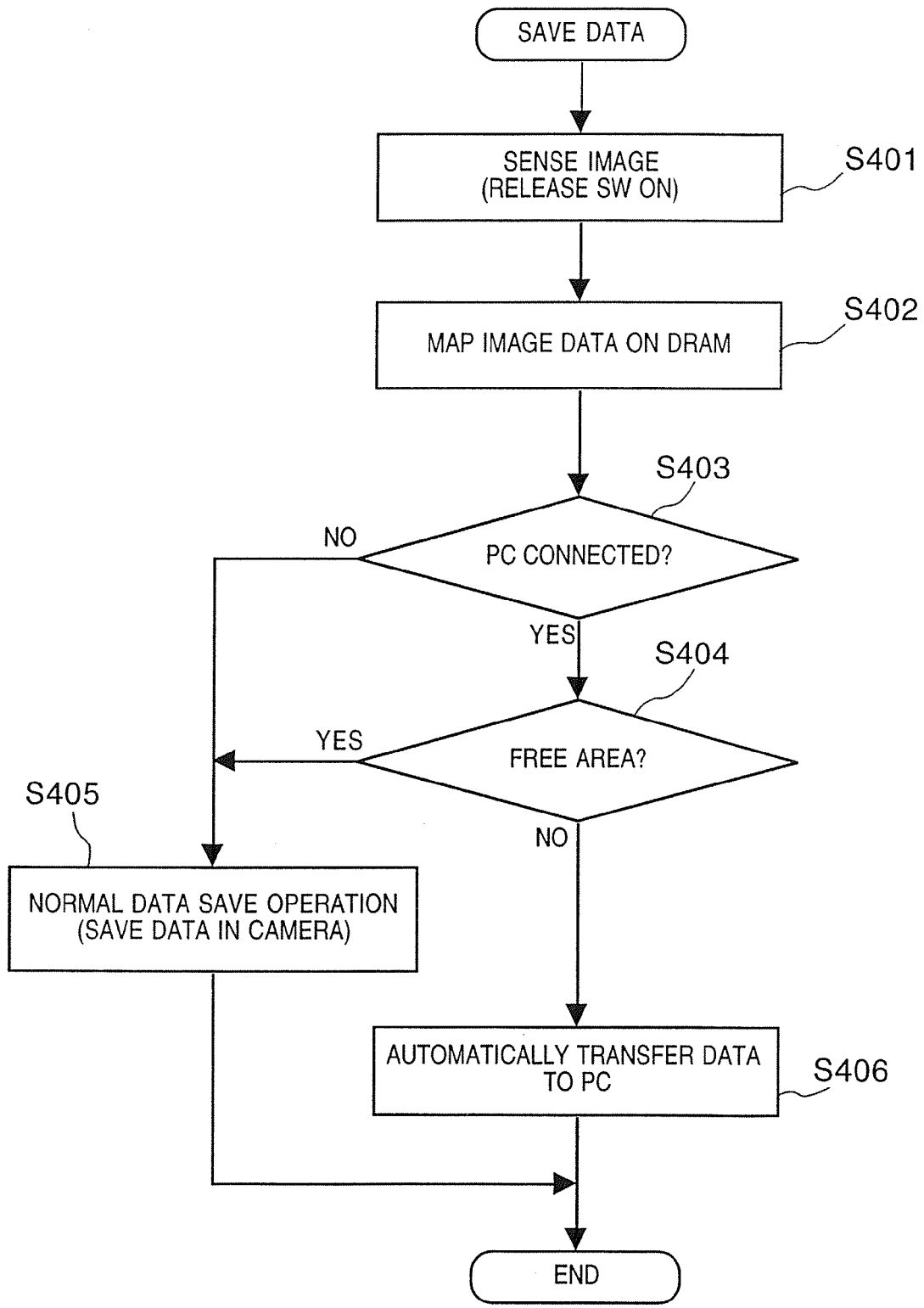
FIG. 4 is a flow chart showing the third example of a sensed image data saving sequence of the digital camera system of the embodiment.

FIG. 4 is a flow chart showing the third example of the sensed image data saving sequence of the digital camera system of this embodiment.

When the digital camera 100 is connected to the information processing apparatus 101, the connection detector 106 detects that fact, and sets an internal flag gConnectionFlag. If the user has pressed the release switch of the digital camera to sense an image (step S401), image data is temporarily stored in a work area (DRAM; not shown) in the digital camera unit 102 (step S402).

After that, the flag gConnectionFlag is checked (step S403). If the digital camera is not connected to the information processing apparatus 101, normal saving operation of the digital camera (e.g., for storing image data if the storage device 103 or storage medium 104 has a free space; otherwise, producing an alarm or the like) is made (step S405). If it is determined in step S403 that the digital camera is connected to the information processing apparatus 101, the result of the recording state detector 105 is checked to determine if an image data recordable area is available in the camera (step S404). If the recordable area is available, the data stored in the above-mentioned temporary work area (DRAM) is saved in that area as normal saving operation (step S405). On the other hand, if it is determined in step S404 that an image data recordable area is not available in the camera, the data is immediately transferred to the information processing apparatus 101 via the cable (step S406). No recordable area is also determined when the digital has only a detachable recording medium, and that recording medium is not attached to the digital camera.

The sequence of sensing and saving image data has been explained. If the digital camera has an audio recording function or a function of generating other kinds of information, such information is saved using the same means and sequence as those described above. In this case, image sensing in step S401 need only be replaced by generation of another information.

In this manner, when the user builds a system by connecting a digital camera to an information processing apparatus such as a PC or the like via a cable, and when an area for storing information is insufficient or does not exist in the digital camera in the system that basically saves in the digital camera information such as a sensed image or the like generated by the digital camera, the information processing apparatus is automatically selected as a data saving location, and image sensing of the digital camera can be proceeded.

Figure 5:
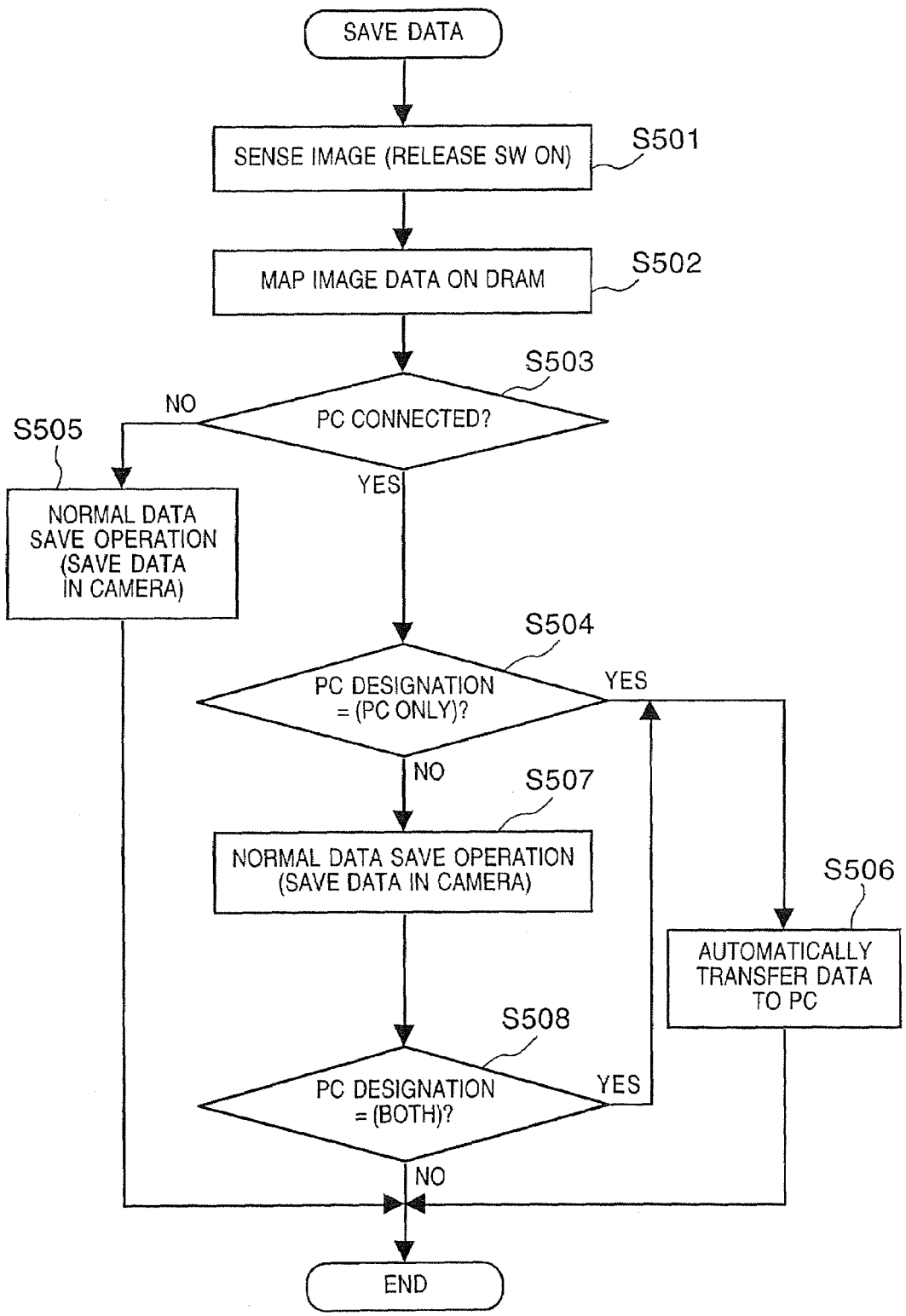
FIG. 5 is a flow chart showing the fourth example of a sensed image data saving sequence of the digital camera system of the embodiment.

FIG. 5 is a flow chart showing the fourth example of the sensed image data saving sequence of the digital camera system of this embodiment.

Figure 6:
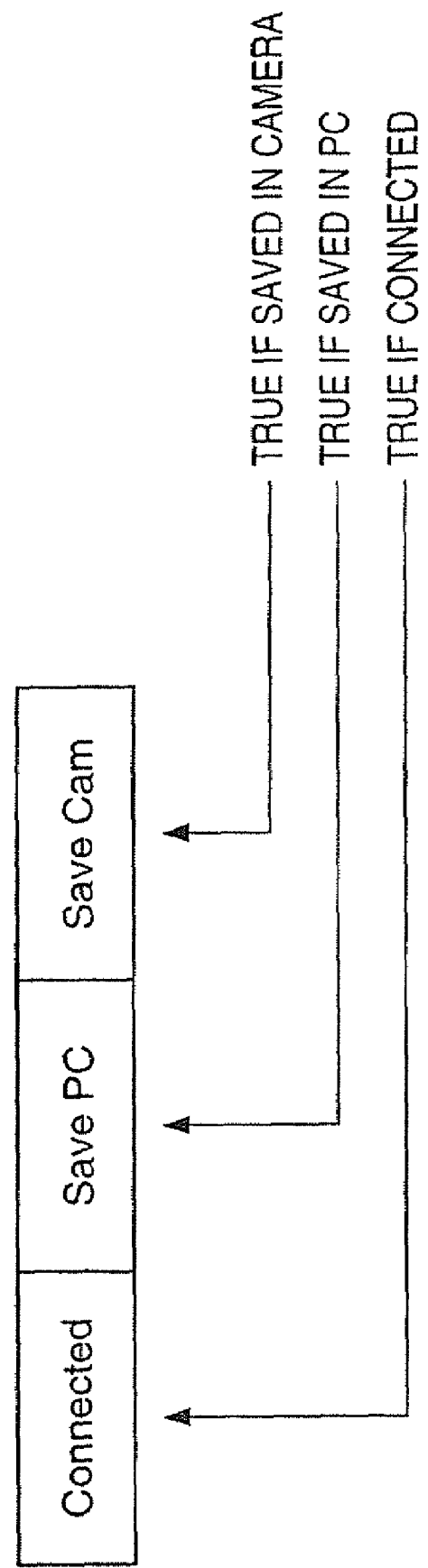
FIG. 6 shows the format of a connection status flag having a saving method designation field, which is used in the fourth example.

When the digital camera 100 is connected to the information processing apparatus 101, the connection detector 106 detects that fact, and sets an internal flag gConnectionFlag. In this example, the flag gConnectionFlag includes a saving method setting field, as shown in FIG. 6, which stores a saving method designated by the information processing apparatus 101 upon connection. If the user has pressed the release switch of the digital camera to sense an image (step S501), image data is temporarily stored in a work area (DRAM; not shown) in the digital camera unit 102 (step S502).

After that, the flag gConnectionFlag is checked (step S503). If the digital camera is not connected to the information processing apparatus 101, normal saving operation of the digital camera (e.g., for storing image data if the storage device 103 or storage medium 104 has a free space; otherwise, producing an alarm or the like) is made (step S505). If it is determined in step S503 that the digital camera is connected to the information processing apparatus 101, the saving method setting field in the flag gConnectionFlag is checked. If it is determined that only "Save PC" is set (step S504), the data stored in the above-mentioned temporary work area (DRAM) is immediately transferred to the information processing apparatus 101 via a cable (step S506).

If it is determined in step S504 that "Save Camera" is set, the data stored in the above-mentioned temporary work area (DRAM) is saved in the storage device 103 such as the fixed internal memory or the like, or the detachable storage medium 104 in the camera (step S507). Furthermore, the saving method setting field in the flag gConnectionFlag is checked, and if it is determined that "Save PC" is also set (step S508), the data stored in the above-mentioned temporary work area (DRAM) is saved in the storage device 103 or storage medium 104, and is also transferred to the information processing apparatus 101 via the cable (step S506).

The sequence of sensing and saving image data has been explained. If the digital camera has an audio recording function or a function of generating other kinds of information, such information is saved using the same means and sequence as those described above. In this case, image sensing in step S501 need only be replaced by generation of another information.

In the above description, the contents of the saving method setting field in the flag gConnectionFlag are set when the digital camera is connected to the information processing apparatus 101. Alternatively, the contents of the saving method setting field in the flag gConnectionFlag may be set by the information processing apparatus 101 at a timing other than the connection timing. In this case, such process can be implemented by substantially the same sequence as that in the fourth example, except that a saving method setting means which can be understood between the information processing apparatus 101 and digital camera 100 must be provided.

According to the fourth example, when the user builds a system by connecting a digital camera to an information processing apparatus such as a PC or the like via a cable, a method of saving information generated by the digital camera can be designated from the information processing apparatus to the digital camera. In this manner, a flexible digital camera system which can adequately meet various user requirements can be built.

Figure 7:
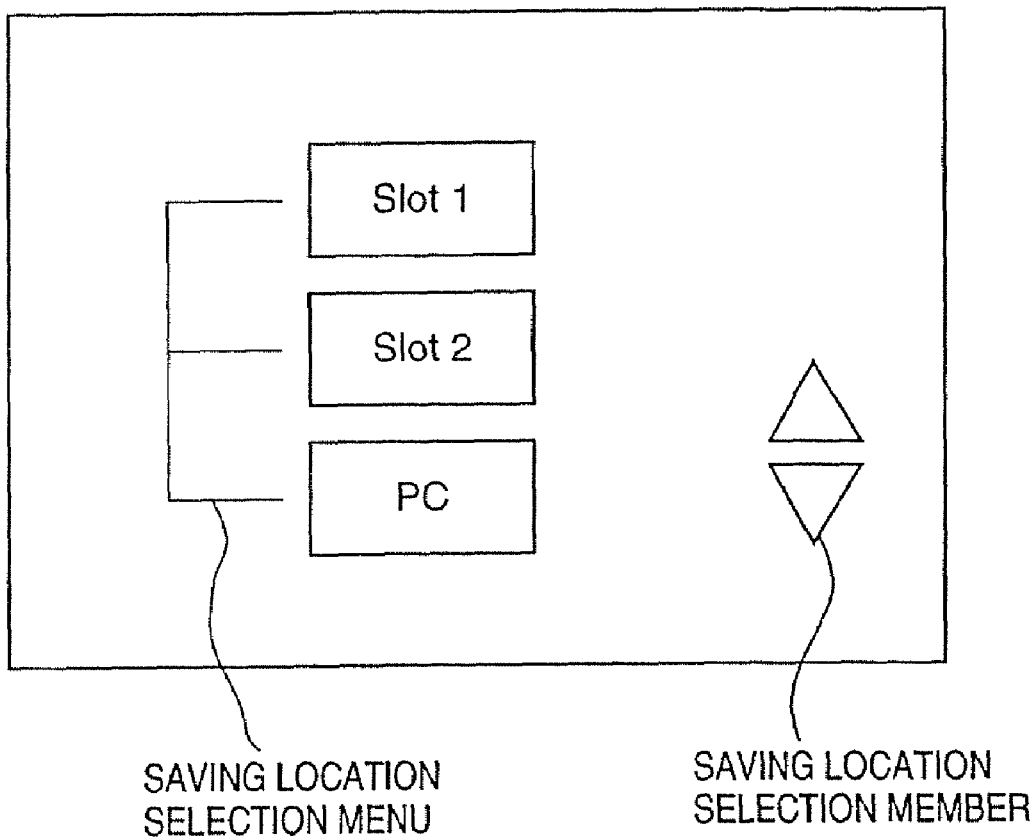
FIG. 7 shows an example of a menu display upon selecting the saving location at the camera main body as a modification of the fourth example.

In the above-mentioned fourth example, the saving method setting means for designating the saving location of data generated by the digital camera is provided to the information processing apparatus 101, but may be provided to the digital camera. In this case, a saving location selection operation member shown in FIG. 7 may be used, and the user can select the saving location by operating this member. FIG. 7 exemplifies a model in which two detachable recording media can be attached to the digital camera. When the information processing apparatus 101 is connected to the digital camera 100, "PC" is added to this menu display, and the user can select the PC by the aforementioned saving location selection operation member. In this manner, when the user builds a system by connecting a digital camera to an information processing apparatus such as a PC or the like via a cable, he or she can select the method of saving information generated by the digital camera on the digital camera main body, thus improving operability.

Figure 8:
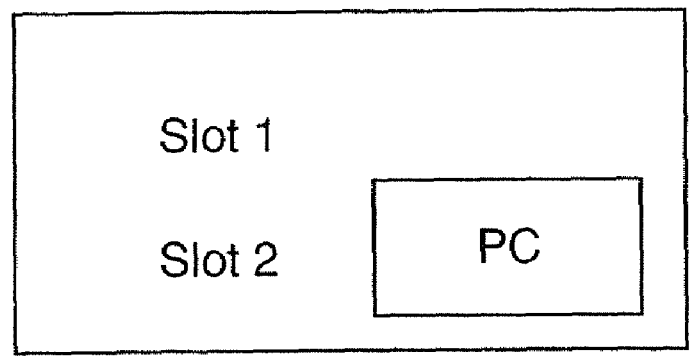
FIG. 8 shows an example of a saving location display.

In the first to fourth examples described above, when the digital camera 100 has a display device such as a liquid crystal display or the like, which can display the saving location of data generated by the digital camera, the saving location determined by the method in each of the first to fourth examples may be displayed on that display device. In this case, one of the selected saving location of "PC", "Slot1", and "Slot2" is highlighted, as shown in FIG. 8. In this manner, the saving location can be clearly presented to the user who is operating the camera, and the user can be prevented from erroneously selecting the saving location.

In the above embodiment, the present invention is applied to the digital camera system, but is not limited to such specific system. For example, the present invention can be applied to a system which uses another information input apparatus and information processing apparatus.

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, in a system in which information such as sensed image data or the like is transferred to the information processing apparatus, and is processed and managed by the information processing apparatus, an information input system which can present a flexible recording method of information input by the information input apparatus and can meet various user needs can be provided.

The present invention is not limited to the above embodiments and various changes and modifications can be made within the spirit and scope of the present invention. Therefore, to apprise the public of the scope of the present invention the following claims are made.

What is claimed is:

1. An image sensing apparatus, comprising:
    an image sensing unit adapted to sense an image and generate image data;
    an internal memory adapted to store the image data;
    a connection detecting unit adapted to detect that an external storage apparatus is connected to the image sensing apparatus; and
    a control unit adapted to control saving operation of the image data stored in the internal memory,
    wherein, if the connection detecting unit detects that the external storage apparatus is not connected to the image sensing apparatus, the control unit controls to save the image data stored in the internal memory in a detachable storage medium but does not transfer the image data to the external storage apparatus, and
    if a saving location for the image data is the detachable storage medium and the external storage apparatus and the connection detecting unit detects that the external storage apparatus is connected to the image sensing apparatus, the control unit controls to perform saving operation of the image data stored in the internal memory in the detachable storage medium and transferring operation of the image data stored in the internal memory to the external storage apparatus in parallel.

2. An image sensing apparatus according to claim 1, wherein, if a saving location for the image data is only the external storage apparatus and the connection detecting unit detects that the external storage apparatus is connected to the image sensing apparatus, the control unit controls to transfer the image data stored in the internal memory to the external storage apparatus but does not save the image data stored in the internal memory in the detachable storage medium.

3. An image sensing apparatus according to claim 1, further comprising a setting unit adapted to set saving location for the image data stored in the internal memory, wherein the setting unit is capable of setting only the external storage apparatus as the saving location or setting both of the external storage apparatus and the detachable storage medium as the saving location.

4. An image sensing apparatus according to claim 3, wherein the setting unit sets the saving location based on a designation from the external storage apparatus.

5. An image sensing apparatus according to claim 3, wherein the image sensing apparatus is capable of attaching another detachable storage media, and the setting unit is capable of setting at least one of the plurality of detachable storage media as the saving location.

6. A method of controlling an image sensing apparatus having an image sensing unit adapted to sense an image and generate image data, an internal memory adapted to store the image data, a connection detecting unit adapted to detect that an external storage apparatus is connected to the image sensing apparatus, said method comprising:
    controlling to save the image data stored in the internal memory in a detachable storage medium but not to transfer the image data to the external storage apparatus, if the connection detecting unit detects that the external storage apparatus is not connected to the image sensing apparatus, and
    controlling to perform saving operation of the image data stored in the internal memory in the detachable storage medium and transferring operation of the image data stored in the internal memory to the external storage apparatus in parallel, if a saving location for the image data is the detachable storage medium and the external storage apparatus and the connection detecting unit detects that the external storage apparatus is connected to the image sensing apparatus.

* * * * *